(12) United States Patent
Kageishi et al.

(10) Patent No.: US 7,091,281 B2
(45) Date of Patent: Aug. 15, 2006

(54) CURABLE COATING COMPOSITION

(75) Inventors: Ichiji Kageishi, Chiba (JP); Yumi Ando, Chiba (JP); Hiroyuki Kobayashi, Ichihara (JP); Yoshitaka Osanai, Ichihara (JP); Yasukazu Suga, Ichihara (JP)

(73) Assignee: Toray Fine Chemicals Co., Ltd. (JP)

( * ) Notice: Subject to any disclaimer, the term of this patent is extended or adjusted under 35 U.S.C. 154(b) by 70 days.

(21) Appl. No.: 10/467,709

(22) PCT Filed: Apr. 5, 2002

(86) PCT No.: PCT/JP02/03420

§ 371 (c)(1),
(2), (4) Date: Aug. 12, 2003

(87) PCT Pub. No.: WO02/083800

PCT Pub. Date: Oct. 24, 2002

(65) Prior Publication Data

US 2004/0220306 A1    Nov. 4, 2004

(30) Foreign Application Priority Data

Apr. 10, 2001 (JP) ............................. 2001-111826
Jun. 14, 2001 (JP) ............................. 2001-180025
Jan. 10, 2002 (JP) ............................. 2002-003286

(51) Int. Cl.
C08L 33/08  (2006.01)
C08L 33/10  (2006.01)

(52) U.S. Cl. ................ 525/100; 525/342; 525/374; 525/194; 525/208; 525/226; 525/227; 525/268

(58) Field of Classification Search ............... 525/194, 525/208, 226, 227, 268, 100, 374, 342; 428/35.8, 428/461

See application file for complete search history.

(56) References Cited

U.S. PATENT DOCUMENTS

| 4,732,790 | A | * | 3/1988  | Blackburn et al. ....... 427/407.1 |
| 5,578,695 | A | * | 11/1996 | Isozaki ....................... 528/271 |
| 5,854,350 | A | * | 12/1998 | Miyazoe et al. ............. 525/100 |
| 5,889,105 | A | * | 3/1999  | Satsuma et al. ............. 524/560 |
| 5,942,570 | A | * | 8/1999  | Matsukura et al. ......... 524/522 |
| 6,071,226 | A | * | 6/2000  | Shinohara et al. ....... 525/327.3 |

FOREIGN PATENT DOCUMENTS

JP        51056834 A  *  5/1976

* cited by examiner

Primary Examiner—David W. Wu
Assistant Examiner—Satya B. Sastri
(74) Attorney, Agent, or Firm—DLA Piper Rudnick Gray Cary US LLP

(57) ABSTRACT

A curable coating composition is provided which comprises an acrylic resin having an epoxy group and a hydroxyl group in the side chain (A) and a compound having an amino group (B). The composition may further comprise a silane compound having an epoxy group or an amino group in the molecule (C).

13 Claims, No Drawings

CURABLE COATING COMPOSITION

TECHNICAL FIELD

The present invention relates to a curable coating composition for the production of a coating having good adhesion to various materials to be coated. More specifically, the present invention provides a curable coating composition having good adhesion to hard adhesive metals such as magnesium alloys, aluminum alloys, titanium alloys and stainless steel and plastics such as polyphenylene sulfide (PPS), polypropylene, acrylonitrile-styrene-butadiene (ABS) resin and an alloy of polycarbonate and ABS resin.

BACKGROUND ART

The functions or properties required for coatings include adhesion to a material to be coated, protection of the coated material and good appearance. Various types of coatings have been developed for these purposes and are put in practical use. Off course, the factor that influences and defines the properties of a coating is a coating resin used in the coating.

The materials to be coated themselves have been bewilderedly changed with the progress of times, and recently more complicated properties and functions have been required for the materials, such as light weight, frame retardancy, recycling properties, easy biodegradability and safety, as well as high strength. Under these circumstances, as the materials to be coated, the following materials have been often used: metals having light weight, high strength and abundant resources and easy recycling properties (e.g., magnesium alloys, aluminum alloys and titanium alloys) as construction materials; plastics having high strength and good transparency (e.g., polycarbonate) as alternatives to glass; and plastics having good flame retardancy (e.g., Noryl, PPS and PC/ABS resin alloy) for application in household electrical appliances.

These materials are generally hard adhesive, and particularly those materials which contains as a constituent a metal atom (e.g., Mg, Al and Zn), such as magnesium alloys, aluminum alloys and titanium alloys, appear to be hardly adhered with a coating. From the standpoint of coatings, these materials are deemed to be hard to adhere, and widely available acrylic melamine resin coatings, acrylic urethane resin coatings, acrylic silicone resin coatings and the like cannot adhere to the surface of these materials. Therefore, use of primers such as so-called "two-part" epoxy resin coatings are needed.

Inconveniently, these metals belong to the most non-noble class from the viewpoint of electroconductivity. Therefore, there are frequent troubles such as electric corrosion on the coated material due to improper application of the coating to the metals, blistering of the coati film observed in the environmental tests (e.g., water resistance test), or readily peeling of the coat film.

To improve and ensure the adhesion of a coating to the materials, it has been widely employed to apply an epoxy resin coating, which is known to have good adhesive properties, as an under coat (primer). Subsequently, the epoxy resin coating is baked, cured, and coated with a top coating (e.g., acrylic melamine resin coating, polyester resin coating, fluorine resin coating), baked and cured. However, in this treatment, it is difficult to ensure the sufficient corrosion resistance of the base material. In practical applications, chemical conversion treatments has been employed, such as formation of a chromium chromate film or a phosphate-chromate film.

When a chemical conversion film is formed as mentioned above, this coating process can provide a coat film having good properties by virtue of the outstanding adhesion and corrosion resistance of an epoxy resin. However, the coating process is called "2C2B" (two times of coating and two times of baking) or "3C3B" (three times of coating and three times of baking; often performed when the coating appearance is disapproval), and the coating workability is quite poor and the yield of the coating is low. Moreover, it takes much time for the coating pretreatment (chemical pretreatments, such as chemical conversion treatment with a chromate, etc.) and the coating process, the coating cost increases, and the efficiency of production of final products is extremely low. Since the epoxy resin forms a tightly cross-linked coat film, the adhesion of a re-coating is insufficient.

The present invention has been made for overcoming the above-mentioned problems. Accordingly, the object of the present invention is to provide a coating having an excellent balance of various properties and a good adhesion to hard adhesive materials, in particular hard adhesive metals and plastics such as magnesium alloys, aluminum alloys, PPS and polypropylene, by using a specific acrylic resin as a coating binder.

Another object of the present invention is to remarkably improve the corrosion resistance of an electrically less noble metals such as magnesium alloy and aluminum alloy.

Still another object of the present invention is to provide a coated article which is coated with the coating, in particular coated article containing, as a constituent element, a magnesium alloy, an aluminum alloy, a titanium alloy, PPS, polypropylene, ABS resin, PC/ABS resin alloy and the like.

DISCLOSURE OF INVENTION

According to the present invention, a curable coating composition is provided which comprises an acrylic resin having an epoxy group and a hydroxyl group in the side chain (A) and a compound having an amino group (B).

BEST MODE FOR CARRYING OUT THE INVENTION

The coating composition according to the present invention comprises, as the film forming components, an acrylic resin having an epoxy group and a hydroxyl group in the side chain (A) and a compound having an amino group (B). The coating composition preferably further comprises a silane composition having an epoxy group or an amino group in the molecule (C).

The acrylic resin having an epoxy group and a hydroxyl group (A) can be prepared by the radical copolymerization of an acrylic monomer having an epoxy group (a-1), an acrylic monomer having a hydroxyl group (a-2) and optionally other unsaturated monomer (a-3). The acrylic resin may be in the form of blocks, pellets, solution or emulsion-dispersion.

The acrylic monomer having an epoxy group (a-1) includes acrylates and methacrylates having an epoxy group and an unsaturated double bond in the molecule, such as glycidyl acrylate, glycidyl methacrylate, methyl glycidyl acrylate, methyl glycidyl methacrylate and 3,4-epoxycyclohexyl methyl acrylate. An acrylic monomer having a non-alicyclic epoxy group (a-1) is preferably used from the view point of curability, adhesion properties and corrosion resistance. The acrylic monomer having an epoxy group may be used singly or in combination.

The acrylic monomer having an epoxy group (a-1) is preferably used in the copolymerization so that the resulting acrylic resin (A) has an epoxy equivalent of 200 to 15000, preferably 250 to 8000, more preferably 450 to 3000. If the epoxy equivalent is less than 200, then the curability of the coating may be somewhat degraded, leading to poor chemical resistance and adhesion to the material to be coated. If the epoxy equivalent is larger than 15000, then the storage stability (i.e., pot-life) of the coating may be too poor, causing poor coating workability and poor appearance of the coating.

The epoxy equivalent can be calculated by the following formula.

Epoxy equivalent=100/[percent copolymerization of acrylic monomer having epoxy group (a-1)/ molecular weight of acrylic monomer having epoxy group (a-1)]

The acrylic monomer having a hydroxyl group (a-2) includes acrylic compounds having a hydroxyl group and an unsaturated double bond in the molecule, such as 2-hydroxyethyl acrylate, 2-hydroxypropyl acrylate, 4-hydroxybutyl acrylate, monoacrylate of cyclohexane dimethanol, 2-hydroxyethyl methacrylate, 2-hydroxypropyl methacrylate, 4-hydroxybutyl methacrylate, monomethacrylate of cyclohexane dimethanol, polyethylene glycol (meth)acrylate, polypropylene glycol (meth)acrylate and polytetramethylene glycol (meth)acrylate. The acrylic monomer having a hydroxyl group (a-2) may be used singly or in combination.

In the present invention, the presence of a hydroxyl group is essential in the acrylic resin (A). If the acrylic resin (A) contains only an epoxy group, then the adhesion of the coating may be reduced and, therefor, the effects of the invention cannot be achieved. At the same time, the curing reaction of the coating may not proceed sufficiently, causing poor resistance against water, chemicals and weather.

The acrylic monomer having a hydroxyl group (a-2) is preferably used in the copolymerization so that the acrylic resin (A) has a hydroxyl functionality of 3 to 150 mgKOH, preferably 5 to 100 mgKOH, more preferably 10 to 90 mgKOH. If the hydroxyl functionality is lower than 3 mgKOH, then the adhesion to a material to be coated may be somewhat degraded. If the hydroxyl functionality is higher than 150 mgKOH, then the resistance of the coat film against water, chemicals and so on may be reduced, causing insufficient protection of the material to be coated (i.e., substrate).

The hydroxyl functionality can be calculated by the following formula.

Hydroxyl functionality=561×[percent copolymerization of acrylic monomer having hydroxyl group (a-2)/molecular weight of acrylic monomer having hydroxyl group (a-2)]

The other unsaturated monomer (a-3) includes, for example, C1–24 (fluoro)alkyl esters of (meth)acrylic acid, such as methyl acrylate, ethyl acrylate, butyl acrylate, cyclohexyl acrylate, 2-ethylhexyl acrylate, lauryl acrylate, isobornyl acrylate, stearyl acrylate, methyl methacrylate, ethyl methacrylate, butyl methacrylate, cyclohexyl methacrylate, 2-ethylhexyl methacrylate, lauryl methacrylate, isobornyl methacrylate, stearyl methacrylate and trifluoroethyl methacrylate; poly(meth)acrylates of polyalkylene glycols, such as ethylene glycol diacrylate, diethylene glycol diacrylate, triethylene glycol diacrylate, propylene glycol diacrylate, trimethylolpropane triacrylate, 1,4-butanediol diacrylate, ethylene glycol dimethacrylate, diethylene glycol dimethacrylate, triethylene glycol dimethacrylate, propylene glycol dimethacrylate, trimethylolpropana trimethacrylate, 1,4-butanediol dimethacrylate, polyethylene glycol diacrylate, polyethylene glycol dimethacrylate, polypropylene glycol diacrylate, polypropylene glycol dimethacrylate, polytetramethylene glycol diacrylate and polytetramethylene glycol dimethacrylate; radical-polymerizable oligomers having at least two acrylic unsaturated double bonds in the molecule, such as polyester (meth)acrylate and polyurethane (meth)acrylate; UV-absorptive unsaturated monomers (R-UVA), such as 2-[2'-hydroxy-5'-(methacryloxymethyl) phenyl]-2H-benztriazol and 2-[2'-hydroxy-5'-(methacryloxyethyl)phenyl]-2H-benztriazol; light-stable unsaturated monomers (R-HALS), such as 4-acryloyloxy-2,2,6,6-tetramethylpiperidine, 4-methacryloyloxy-2,2,6,6-tetramethylpiperidine, 4-acryloylamino-2,2,6,6-tetramethylpiperidine and 4-methacryloylamino-2,2,6,6-tetramethylpiperidine; unsaturated monomers having a vinyl group, such as styrene, vinyl acetate and vinyl toluene; and macromonomers having an acrylic unsaturated double bond at the polymer terminal, such as poly(methyl methacrylate) macromer and polystyrene macromer. The other unsaturated monomer (a-3) may be used singly or in combination.

Among these monomers, when the acrylic resin (A) is prepared by emulsion copolymerization, poly(meth)acrylates of polyalkylene glycols are particularly preferably used as the other unsaturated monomer (a-3), such as ethylene glycol diacrylate, diethylene glycol diacrylate, triethylene glycol diacrylate, propylene glycol diacrylate, trimethylolpropane triacrylate, 1,4-butanediol diacrylate, ethylene glycol dimethacrylate, diethylene glycol dimethacrylate, triethylene glycol dimethacrylate, propylene glycol dimethacrylate, trimethylolpropane trimethacrylate, 1,4-butanediol dimethacrylate, polyethylene glycol diacrylate, polyethylene glycol dimethacrylate, polypropylene glycol diacrylate, polypropylene glycol dimethacrylate, polytetramethylene glycol diacrylate and polytetramethylene glycol dimethacrylate. When the poly(meth)acrylate of polyalkylene glycol is used in the copolymerization, the coat film tends to be tightly cross-linked, leading to largely improved resistance of the coat film against water, chemicals and weather. More surprisingly, when a particular poly(meth)acrylate of a polyalkylene glycol, such as polytetramethylene glycol di(meth)acrylate (number mean molecular weight: 200 to 2000) is used in the copolymerization, good impact resistance and flexibility of the coat film can be provided without reduction in hardness, (i.e., mechanical resistance, including scratch resistance).

The poly(meth)acrylate of polyalkylene glycol is preferably copolymerized in an amount of 0.01 to 30% by weight, more preferably 0.3 to 25% by weight, particularly preferably 0.05 to 20% by weight, based on the total amount of the monomers constituting the acrylic resin (A). If the amount is less than 0.01% by weight, then satisfactory impact resistance and flexibility of the coat film may be hardly achieved. If the amount is larger than 30% by weight, then the transparency of the coat film may be somewhat reduced, causing reduction in visual appearance.

Among these unsaturated monomers, those having a cycloalkyl group, such as cyclohexyl methacrylate and isobornyl methacrylate, are particularly suitable, because such monomers can improve the storage stability and weather resistance of the coat film. When such an unsaturated monomer having a cycloalkyl group is contained, the total content is not particularly limited, but is preferably approximately 5 to 30% by weight based on the weight of the acrylic resin (A).

The UV-absorbent unsaturated monomer (R-UVA) is preferred as the other unsaturated monomer (a-3), because not only it can improve the weather resistance of the coat film, but also provide the material to be coated (e.g., polycarbonate) with the protection against degradation caused by light exposure. The R-UVA is preferably copolymerized in an amount of 0.02 to 40% by weight, more preferably 0.5 to 30% by weight, based on the total amount of the unsaturated monomers constituting the acrylic resin (A). Use of the amount less than 0.5% by weight may not largely-contribute to the improvement of weather resistance of the coat film. Use of the amount larger than 40% by weight may cause undesirable color development of the coat film due to the interaction with the amino group derived from the compound having an amino group (B) described below and also cause reduction in chemical resistance. Preferred examples of the R-UVA include 2-(2'-hydroxy-5'-methacryloyloxyethylphenyl)-2H-benztriazole and 2-(2'-hydroxy-5'-acryloyloxyethylphenyl)-2H-benztriazole.

The light-stable unsaturated monomer (R-HALS) is preferably used as the other unsaturated monomer (a-3), because it can improve the weather resistance of the coat film and storage stability of the coating. Particularly when the R-HALS has a base constant (PKb) of less than 8, the same effects as those provided by the below-mentioned compound having an amino group (B) can be achieved and the curability and adhesion to a substrate of the coating can be remarkably improved. The HALS having a base constant of less than 8 includes piperidine-type HALSs such as 4-acryloyloxy-2,2,6,6-tetramethylpiperidine and 4-methacryloyloxy-2,2,6,6-tetramethylpiperidine.

The R-HALS is preferably copolymerized in an amount of 0.5 to 25% by weight, more preferably 0.5 to 30% by weight, based on the total amount of the unsaturated monomers constituting the acrylic resin (A). If the amount is less than 0.02% by weight, weather resistance of the coat film may not be improved remarkably. If of the amount is larger than 30% by weight, the viscosity of the coating may be increased, resulting in slight reduction in coating workability and adhesion efficiency.

It is more preferred to copolymerize a macromonomer such as poly(methyl methacrylate) macromonomer and polystyrene macromonomer. When the macromonomer is copolymerized, the acrylic resin (A) can be formed as a graft copolymer and, therefore, the compatibility with the below-mentioned compound having an amino group (B) can be improved, leading to storage stability and curability of the coating and appearance of the coat film. The improvement in compatibility may also provide the improvement in wettability to a substrate and adhesion.

The macromonomer is preferably copolymerized in an amount of 0.02 to 30% by weight, more preferably 0.5 to 20% by weight, based on the total amount of the unsaturated monomers constituting the acrylic resin (A). If the amount is less than 0.02% by weight, compatibility may not be improved satisfactorily, leading to poor curability of the coating. If the amount is larger than 30% by weight, storage stability of the coating may be reduced to some extent. The number average molecular weight of the macromonomer is not particularly limited, but preferably about 1000 to 30000. The macromonomer having the number mean molecular weight of less than 1000 may not exhibit the remarkable effects as a graft copolymer, and leveling properties of the coating and the evenness of the coat film may not be improved remarkably. In contrast, the macromonomer having the number mean molecular weight of larger than 30000 may make the coating too viscous, causing slightly poor coating workability, and also may make the nature of the resulting graft copolymer too exaggeratory, causing slightly poor adhesion.

An example of the production of the acrylic resin (A) is as follows.

An acrylic monomer having an epoxy group (a-1), an acrylic monomer having a hydroxyl group (a-2) and optionally other unsaturated monomer (a-3) are subjected to radical copolymerization in a polymerization solvent or disperse medium such as an organic solvent (e.g., toluene, xylene, ethyl acetate, butyl acetate, methyl isobutyl ketone, butyl cellosolve, isopropyl alcohol) or water, at 20 to 150° C., thereby producing a acrylic resin (A).

In the copolymerization, a polymerization initiator, such as an organic or inorganic azo compound or an organic peroxide, including $\alpha,\alpha$-azobisisobutyronitrile, benzoyl peroxide and ammonium persulfate; a polymerization degree modifier such as dodecylmercaptane and alphamethylstyrene dimmer; and non-inonic and/or anionic surfactant (emulsifier), such as poly(sodium oxyethylenealkyl sulfate), may be used.

The acrylic resin (A) can be produced in the form of solids in the block polymerization; a slurry or powder or pellets both which are produced by grinding or pelletization of the slurry in the suspension polymerization; a solution in a solvent in the solution polymerization with an organic solvent; and an emulsion of polymer particles in water in an emulsion polymerization with water. Any form of the acrylic resin (A) may be employed depending on the intended use. For use as a coating as in the case of the present invention, the acrylic resin (A) is preferably produced by solution polymerization or emulsion polymerization. This is because the acrylic resin (A) can be used as a solution or emulsion as-is without any purification process such as, separation, precipitation, grinding, pelletization, solvent replacement, re-dissolution in a solvent and distillation.

In the production by solution polymerization, the acrylic resin (A) preferably has a number average molecular weight of 2000 to 200000, preferably 3000 to 100000. The number average molecular weight of less than 2000 may cause reduction in curability of the coating and slight reduction in resistance against chemicals and water. The number average molecular weight of higher than 200000, on the contrary, may cause increase in viscosity of the coating, resulting in poor coating, resulting in poor coating workability. In this case, the pot-life of the coating may be also shorter, often adversely affecting on storage stability of the coating. However, these are not true for the production by emulsion polymerization.

The compound having an amino group (B) can react with the acrylic resin (A) having an epoxy group and an hydroxyl group in the side chain, and serves to provide a cross-link structure to the coat film. At the same time, as the specific effect of the amino group in the compound (B), the compound (B) can improve the adhesion to a substrate and also remarkably improve the corrosion resistance. Any compound having an amino group in the molecule may be used as the compound (B).

The compound having an amino group (B) includes, for example, a compound having a reactive nitrogen atom, preferably a compound having an alkylamino, piperidine, piperadine, alkylaminoalkylphenyl, alkylaminoalkylphenol, morpholino, imidazole or imidazoline group, more preferably a compound having an alkylaminoalkylphenol, imidazole or imidazoline group. The compound having an amino group (B) preferably has a molecular weight of not larger than 1000. The compound having an amino group (B) which has such a molecular weight has a good compatibility with the acrylic resin (A) and, therefore the reactivity with the acrylic resin (A) can also be enhanced, leading to improvement in curability and adhesion to a substrate of the coating.

The compound having an amino group (B) may be an oligomer or polymer which has an amino group in the backbone, the side chain and/or the terminal.

Preferred examples of the compound (B) include those compound (b-1) represented by general formula (I):

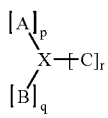

[I]

wherein:

X represents a hydrogen atom, an aliphatic hydrocarbon group having 1 to 10 carbon atoms which has at least one substituent selected from the group consisting of A, B and C, a group having a benzene skeleton which may substituted by a hydroxyl group and/or an alkyl group having 1 to 10 carbon atoms, or an alicyclic hydrocarbon group having 3 to 10 carbon atoms;

each of A, B and C is independently a group represented by general formula (II) or (III):

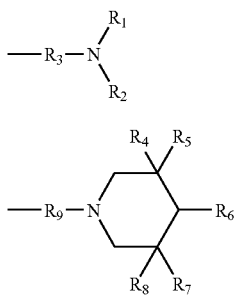

[II]

[III]

wherein each of $R_1$, $R_2$, $R_4$, $R_5$, $R_6$, $R_7$ and $R_8$ independently represents a hydrogen atom or an alkyl group having 1 to 10 carbon atoms; each of $R_3$ and $R_9$ independently represents an alkylene group having 1 to 10 carbon atoms or a carbonyl group; and each of p, q and r is an integer of 0 or 1, provided that at least one of p, q and r is 1.

In the general formula (I), when the total of p, q and r is 1, X may be a hydrogen atom or an alkyl group having 1 to 10 carbon atoms, a phenyl group, a hydroxyphenyl group, a hydroxyphenylalkyl group (of which the alkyl group has 1 to 10 carbon atoms) or a cycloalkyl group having 3 to 10 carbon atoms; while when the total of p, q and r is 2 or 3, each of these groups (except for hydrogen atom) is substituted by one or two substituents selected from A, B and C.

Among those compounds represented by general formula (I), a compound having both an amino group and an hydroxyl group in the molecule is particularly preferred.

Preferred examples of the compound (B) include (including those not represented by general formula (I)) monomethylamine, dimethylamine, trimethylamine, monoethylamine, diethylamine, isopropylamine, di-n-propylamine, diallylamine, diamylamine, di-n-butylamine, diisobutylamine, di-sec-butylamine, N-ethyl-1,2-dimethylpropylamine, N-methylhexylamine, di-n-octylamine, piperidine, 2-pipecoline, 3-pipecoline, 4-pipecoline, 2,4-, 2,6-, 3,5-lupetidine, 3-piperidinemethanol triethylamine, triethylamine, tributylamine, triallylamine, N-methyldiallylamine, N-methylmorphorine, N,N,N',N'-tetramethyl-1,2-diaminoethane, N-methylpiperidine, pyridine, 4-ethylpyridine, hexamethylenediamine, 2,4,6-tris(dimethylaminomethyl)phenol, 2,4,6-tris(dimethylaminoethyl)phenol, 2,4,6-tris(dimethylaminopropyl)phenol, benzoguanamine, cyanoguanidine, hexamethylenetetramine, polyoxypuropylene-α, ω-diamine, phenyldimethyluea, xylenediamine, lezole polycondensation products, addition products of acrylonitrile-butadiene copolymer and 1-(2-aminoethyl)piperadine, N-(2-aminoethyl)piperadine and N,N-dimethylaminopropylamine. These compounds may be used singly or in combination.

Among these compounds, those compounds having a phenolic hydroxyl group and an amino group in the molecule, such as 2,4,6-tris(dimethylaminomethyl)phenol and 2,4,6-tris(dimethylaminoethyl)phenol, are preferred, because they can improve the hardness and adhesion of the coat film.

The compound (B) having an amino group may be a compound having an imidazole group and/or an imidazoline group (b-2). The compound having an imidazole group and/or an imidazoline group (b-2) has good compatibility with the acrylic resin (A), can provide a coat film having a tightly cross-linked structure and having good resistance against water and chemicals, and also can improve corrosion resistance of aluminum alloys and magnesium alloys.

A polymerization initiator having an imidazole group and/or an imidazoline group may be used in the radical copolymerization for the production of the acrylic resin (A). In this case, an imidazole group and/or an imidazoline group that are active can be introduced at the terminal of the acrylic resin (A). As a result, the storage stability of the coating can be improved. In addition, dense cross-linking can be formed in the coating and a part of the coating may form an IPN (inter penetrating polymer network) polymer, often leading to dramatic improvement of mechanical strength and chemical properties of the coating. The adhesion and corrosion resistance may also be remarkably improved.

The tendencies, effects and functions as mentioned above become particularly noticeable when the acrylic resin (A) is produced by emulsion polymerization.

The compound having an imidazole group and/or an imidazoline group (b-2) includes, for example, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 2-methylimidazole, 2-phenylimidazoline, 2,2'-azobis[2-(5-methyl-2-imidazolin-2-yl)propane]dihydrochloride ("VA-041", Wako Pure Chemical Industries, Ltd.), 2,2'-azobis[2-(2-imidazolin-2-yl)propane]dihydrochloride ("VA-044", Wako Pure Chemical Industries, Ltd.), 2,2'-azobis[2-(2-imidazolin-2-yl)propane]disulfate dihydrate ("VA-046B", Wako Pure Chemical Industries, Ltd.), 2,2'-azobis[[1-(2-dihydroxyethyl)-2-imidazolin-2-yl)propane]dihydrochloride ("VA-060", Wako Pure Chemical Industries, Ltd.), 2,2'-azobis[2-imidazolin-2-yl)propane] ("VA-061", Wako Pure Chemical Industries, Ltd.), formylimidazole, diformylimidazole, imidazol dithicarboxylate, imidazole carboxylate, dihydroxymethylimidazole, 2-[3-[3-trimethoxysilylpropyloxy]-2-hydroxy-propyl]imidazole, 1-(3-trimethoxysilylpropyl)imidazole, 1-(3-triethoxysilylpropyl)imidazole, 1-acethyl-2-(3-trimethoxysilylpropyl)imidazole and 2-(3-trimethoxysilylpropyl)imidazole. The compound having an imidazole group and/or an imidazoline group (b-2) may be used singly or in combination.

The acrylic resin (A) and the compound having an amino group (B) are preferably blended at a ratio of 60/40 to 99.99/0.01 by weight, more preferably 80/20 to 99.99/0.01 by weight. When the both components are blended at such a ratio, various properties of the coating including storage stability, adhesion to a substrate and coat film appearance may be improved. Surprisingly, in this case, adhesion to a variety of substrates, including plastics (e.g., ABS resin, PPS, PC), inorganic materials (e.g., glass, asbestos cement slate, mortar), metals (e.g., iron, aluminum, magnesium, zinc) and alloys, tends to be largely improved. If the blending ratio is less than 60/40 by weight, the hardness of the curability of the coating may be reduced to some extent. If the blending ratio is higher than 99.99/0.01 by weight, on the contrary, adhesion to various substrates, particularly to metals, may be slightly reduced.

The coating composition according to the present invention may be produced by any process, as long as the acrylic resin having an epoxy group and a hydroxyl group in the side chain (A) and the compound having an amino group (B) can be dispersed or dissolved to give a homogenous solution or dispersion. Briefly, for example, the compound having an amino group (B) is added to the acrylic resin (A) while stirring and the stirring is continued until a homogenous solution is produced. In this case, it is desirable to previously dissolve or disperse the compound having an amino group (B) in a solvent (e.g., toluene, xylene) so that the homogeneity of the solution can be increased and therefore the operation efficiency can be improved.

When a polymerization initiator having an imidazole group and/or an imidazoline group (b-3) is used in the preparation of the acrylic resin (A), the homogeneity of the solution is achieved during the emulsion polymerization process. Therefore, any special operation is not required.

If necessary, various coating additives may be blended, such as pigments including titanium oxide, calcium oxide, mica, aluminum and carbon black; solvents for controlling the viscosity of the coating, including toluene, xylene, ethyl acetate, butyl acetate, methyl alcohol, ethyl alcohol, isopropyl alcohol, n-propyl alcohol, n-butyl alcohol, ethylene glycol monoethyl ether, ethylene glycol monobutyl ether, propylene glycol monomethyl ether, dipropylene glycol n-butyl ether, γ-butyl lactone, methyl isobutyl ketone and water; anti-settling agents; leveling agents; anti-slip agents; defoaming agents; mildew-proofing agents; alga-proofing agents; and anti-corrosive agents. In addition, resins, plasticizers, additives, anti-oxidants, light stabilizers (preferably those of hindered amine types (HALS) having a base constant (PKb) of 8 or higher) and so on which are commonly blended in a coating may also be blended.

Particularly, an anti-oxidant is preferably used, because it can improve the coloring property of a coating and a coat film.

Examples of the anti-oxidant include 2,6-di-t-butyl-p-cresol, butylated hydroxyanisole, 2,6-di-t-butyl-4-ethylphenol, stearyl-β-(3,5-di-t-4-hydroxyphenyl) propionate, 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), 3,9-bis(1,1-dimethyl-2-[β-(3-t-butyl-4-hydroxy-5-methylphenyl)propionyloxy]ethyl)2,4,8,10-tetraoxaspyro[5.5]undecane, 1,1,3-tris(2-methyl-4-hydroxy-5-t-butylphenyl) butane, 1,3,5-trimethyl-2,4,6-tris(3,5-di-t-butyl-4-hydroxybenzyl)benzene, tetrakis-(methylene-3-(3',5'-di-t-butyl-4'-hydroxyphenyl)propionate methane, bis[3,3'-bis-(4'-hydroxy-3'-t-butylphenyl)butylic acid] glycol ester, 1,3,5-tris(3',5'-di-t-butyl-4'-hydroxybenzyl)-sec-triazine-2,4,6 (1H,3H,5H)trione, tocopherol, dilauryl 3,3'-thiodipropionate, dimyristyl 3,3'-thiodipropionate, distearyl 3,3'-thiodipropionate, diphenylisodecyl phosphate, phenyl-diisodecyl-phosphate, 4,4'-butylidene-bis(3-methyl-6-t-butylphenylditridecyl) phosphate, cyclic neopentane tetrabis (octadicyl phosphate), tris(nonylphenyl) phosphate, tris (monononylphenyl phosphate), tris(dinonylphenyl phosphate), isodecyl pentaerythritol diphosphate, 9,10-dihydro-9-oxa-10-phosphaphenanthrene-10-oxide, 10-(3,5-di-t-butyl-4-hydroxybenzyl)-dihydro-9-oxa-10-phosphaphenanthrene-10-oxide, 10-decyloxy-9,10-9-oxa-10-phosphaphenanthrene, tris(2,4-di-t-buthylphenyl) phosphate, cyclic neopentatetraylbis(2,4-di-t-butylphenyl) phosphate, cyclic neopentatetraylbis(2,6-di-t-butyl-4-methylphenyl) phosphate and 2,2-methylenebis(4,6-di-t-butylphenyl) octylphosphate. The antioxidant may be used singly or in combination.

Among these compounds, phenol type or phosphate type compounds are preferably used, such as stearyl-β-(3,5-di-t-butyl-4-hydroxyphenyl) propionate, tetrakis-[methylene-3-(3',5'-di-t-butyl-4'-hydroxyphenyl)propionate] methane.

As stated above, the curable coating composition of the present invention may comprise the acrylic resin (A) and the compound (B), as well as various additives. In the curable coating composition, the total amount of the acrylic resin (A) and the compound (B) is preferably not lower than 50% by weight, more preferably not lower than 80% by weight.

In the present invention, a silane compound having an epoxy group or an amino group in the molecule (C) may be blended, so as to dramatically improve the adhesion of the coating to various substrates (i.e., materials to be coated), including plastics such as ABS resin, PC resin, Noryl resin, PPS resin, polyamide resin, PC/ABS resin alloy, polyester resin, polystyrene and poly(methyl methacrylate); thermosetting resins such as unsaturated polyester and epoxy resin; inorganic materials such as glass, asbestos cement slate and mortar; metals such as iron, aluminum, magnesium and zinc; and alloys.

The silane compound having an epoxy group or an amino group in the molecule (C) is not particularly limited, and includes those silane compounds represented by general formula (IV) and hydrolysates and condensates thereof:

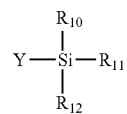

[IV]

wherein each of $R_{10}$, $R_{11}$ and $R_{12}$ independently represents an alkyl group having 1 to 6 carbon atoms or an alkoxy group having 1 to 6 carbon atoms; and Y represents an epoxyalkyl group having 1 to 6 carbon atoms, an epoxycycloalkyl group having 4 to 8 carbon atoms, an epoxycycloalkylalkyl group having 5 to 14 carbon atoms or an aminoalkyl group having 1 to 6 carbon atoms.

Preferred examples of the silane compound (C) include γ-glycidoxypropyltrimethoxysilane, γ-glycidoxypropyltriethoxysilane, γ-glycidoxypropylmethyldimethoxysilane, γ-(3,4-epoxycyclohexyl)ethyltriethoxysilane, 3-aminopropyltrimethoxysilane, 3-aminopropyltriethoxysilane, and hydrolysates and condensates thereof. The compound may be used singly or in combination.

The silane compound having an epoxy group or an amino group in the molecule (C) is preferably blended in an amount of 0.02 to 500% by weight, more preferably 0.5 to 300% by weight, based on the total amount of the acrylic resin (A) and the compound (B). If the blending amount is less than 0.02% by weight, the curability of the coating and adhesion to a substrate, particularly to an inorganic substrate or a metal may be reduced. If the blending amount is higher than 500% by weight, wettability of the coating to a substrate may be degraded, causing poor adhesion and coat film appearance.

According to the present invention, a silane compound having an epoxy group and an alkoxy group in the molecule (c-1) may be blended with the acrylic resin (A). In this case, adhesion of the coating to an aluminum alloy, a magnesium alloy and so on can be remarkably improved. Moreover, the resistance of the coat film against corrosion, water and saline water can also be improved without forming a protective film by chemical conversion treatment.

This notable effect appears to be provided by such a mechanism that the alkoxysilane group and/or a silanol group in the silane compound having an epoxy group and a hydrolyzable alkoxysilane group in the molecule (c-1) can form a tight chemical bond with an aluminum alloy (Al—OH which seems to be present abundantly on the surface of the alloy), a magnesium alloy or the like via orientation to the aluminum or magnesium alloy or the like or hydrolysis, so that a chemically and electrically extremely stable, homogenous continuous layer can be formed on the surface of the alloy. In addition, the epoxy group in the silane compound having an epoxy group and a hydrolyzable alkoxysilane group in the molecule (c-1) can form a chemical, electrical or compatibilization-derived tight bond with the functional groups (i.e., epoxy and hydroxyl groups) of the acrylic resin (A), so that a homogenous, stiff coat film can be formed on the surface of the alloys. As a result, a good coating appearance can be provided, resistance of the coat film against scratch. and weather can be improved, and chemical or electric development of corrosion on non-iron metals caused by any external factor can be prevented.

In the present invention, as a coating binder, an acrylic emulsion (A-1) may be used, which is produced by the emulsion copolymerization of an acrylic monomer having an epoxy group (a-1), an acrylic monomer having an hydroxyl group (a-2) and optionally other unsaturated monomer (a-3) in an aqueous medium using a reactive emulsifier having an unsaturated double bond in the molecule (D) and a polymerization initiator having an imidazole group and/or an imidazoline group (b-3). Use of the acrylic emulsion (A-1) is desirable, because environmental pollution caused by organic solvents discharged during the process may be prevented.

The acrylic monomer having an epoxy group (a-1), the acrylic monomer having a hydroxyl group (a-2) and the other unsaturated monomer (a-3) used may be those mentioned above. As the other unsaturated monomer (a-3), a certain poly(meth)acrylate of a polyalkylene glycol is preferred, such as polytetramethylene glycol di(meth)acrylate (number average molecular weight: 200 to 2000). Use of this type of unsaturated monomer (a-3) may provide the coat film with impact resistance and flexibility, without reduction in hardness, accordingly mechanical strength (e.g., scratch resistance) of the coat film.

Recently, the problem of global environmental pollution, including global warming and destruction of the ozone shield, has become a serious concern. In the filed of coating and painting, strenuous efforts have been made in resolving the problem. For example, development of non-solvent type of coatings (e.g., powder coating, reactive coating), high-solid type of coatings and water-based coatings falls under the efforts.

On the other hand, the functions required for coating include visual appearance (improvement in surface appearance), protection of a material to be coated and so on. However, the current technologies are not quite satisfactory. For example, in non-solvent type coatings, baking at a higher temperature or irradiation with light is required during film forming process, causing reduction in coating workability. In high-solid type coatings, the molecular weight of a binder should be largely reduced, causing reduction in coat film properties primarily including fundamental properties (e.g., adhesion, water resistance). For water-based coatings, unlike lower-humid areas such as Europe, there is an apprehension in steamy areas including Japan that stickiness and poor durability of the coat film may occur.

Non-iron metals, such as magnesium alloys and aluminum alloys, are generally underwent a chemical conversion treatment (e.g., treatment with chromate) due to its poor corrosion resistance. The chemical conversion treatment such as treatment with chromate, however, may cause serious environmental pollution and ultimately exert serious influence on biological environment, if the treatment solution is contaminated into the waste. Under these circumstances, alternative methods for providing a anti-corrosive coating have been intensively researched, but any useful method has not yet been found.

Use of the acrylic emulsion as a binder enables to provide a curable coating composition which is environmentally and ecologically friendly, has good adhesion, corrosion resistance and weather resistance, can provide a good coating appearance, and suitable as a coating for hard adhesive (non-iron) metals including magnesium alloys, aluminum alloys and stainless steel.

The emulsion copolymerization for the acrylic emulsion (A-1) is conducted in an aqueous medium. The aqueous medium means a medium primarily consisting of water, which may contain hydrophilic organic solvent that has a solubility to water of 10% or higher at 25° C. in an amount less than 50% by weight, including methyl alcohol, ethyl alcohol, n-propyl alcohol and isopropyl alcohol, if necessary. Water is preferably ion exchanged water which more preferably has an electroconductivity of 500 μs/cm or lower.

The acrylic emulsion (A-1) can be produced by the emulsion copolymerization of an acrylic monomer having an epoxy group (a-1), an acrylic monomer having an hydroxyl group (a-2) and optionally other unsaturated monomer (a-3) in an aqueous medium using a reactive emulsifier having an unsaturated double bond in the molecule (D) and a polymerization initiator having an imidazole group and/or an imidazoline group (b-3).

In the emulsion copolymerization for the acrylic emulsion (A-1), a reactive emulsifier having an unsaturated double bond in the molecule (D) is preferably used. The reactive emulsifier (D) includes, for example, those compounds represented by formula (V) or (VI). The reactive emulsifier (D) may be used singly or in combination. The reactive emulsifier (D) is preferably used in an amount of 0.02 to 30% by weight, preferably 0.02 to 20% by weight, more preferably 0.2 to 18% by weight, particularly preferred 0.5 to 10% by weight, based on the total amount of the unsaturated monomers constituting the acrylic emulsion (A). If the reactive emulsifier is used in an amount less than 0.02% by weight, aggregation may occur during the emulsion polymerization. If the reactive emulsifier is used in an amount larger than 30% by weight, in contrast, water resistance and chemical resistance may be reduced.

Formula (V):

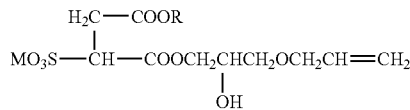

wherein R represents $C_{18}H_{36}F_1$; and M represents Na or $NH_4$.

Formula (VI):

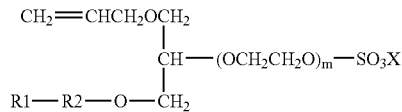

wherein R1 represents an alkyl group having 1 to 24 carbon atoms; R2 represents a benzene ring or an alkyl group having 1 to 24 carbon atoms; X represents Na or $NH_4$; and m is an integer from 5 to 50.

In formula (V) or (VI), when M or X is Na, the resulting acrylic emulsion (A-1) is retained at pH 5 to 10 and the epoxy group in the acrylic monomer having an epoxy group (a-1) remains in the emulsion, leading to improved curability and adhesion of the coating. Furthermore, when the acrylic emulsion (A-1) is used for coating of a metal with poor corrosion resistance (e.g., magnesium alloy), a good appearance can be provided without corrosion of the metal.

When M or X is $NH_4$ in the formula (V) or (VI), the resulting acrylic emulsion (A-1) is retained at pH 5 to 10 and the epoxy group in the acrylic monomer having an epoxy group (a-1) remains in the emulsion, leading to improved curability and adhesion of the coating. In addition, water resistance and humidity resistance can also be remarkably improved.

Examples of the polymerization initiator having an imidazole group and/or an imidazoline group (b-3) includes 2,2'-azobis(2-(5-methyl-2-imidazolin-2-yl)propane dihydrochloride (Wako Pure Chemical Industries, Ltd.; VA-041), 2,2'-azobis[2-(2-imidazolin-2-yl)propane] dihydrochloride (Wako Pure Chemical Industries, Ltd.; VA-044), 2,2'-azobis [2-(2-imidazolin-2-yl)propane disulfate dihydrate (Wako Pure-Chemical Industries, Ltd.; VA-046B), 2,2'-azobis[[1-(2-hydroxyethyl)-2-imidazolin-2-yl)propane dihydrochloride (Wako Pure Chemical Industries, Ltd.; VA-060) and 2,2'-azobis[2-imidazolin-2-yl)propane] (Wako Pure Chemical Industries, Ltd.; VA-061). The polymerization initiator having an imidazole group and/or an imidazoline group (b-3) may be used singly or in combination. Among these compounds, those compound having no sulfate ion or chlorine ion in the molecule, such as 2,2'-azobis[2-imidazolin-2-yl)propane], are particularly suitable, because metals such as magnesium alloys and aluminum alloys are not chemically attacked and good coating appearance can be provided. The polymerization initiator having an imidazole group and/or an imidazoline group (b-3) serves as a polymerization initiator in the emulsion copolymerization, and is added to the terminal of the polymer chain. As a result, a cross-linking reaction occurs between polymers during the curing of the emulsion coating, leading to improvement in curability and adhesion of the coating.

The polymerization initiator having an imidazole group and/or an imidazoline group (b-3) is desirably used in an amount of 0.001 to 30% by weight, preferably 0.002 to 20% by weight, more preferably 0.005 to 10% by weight, based on the total amount of the radical-copolymerizable unsaturated monomers constituting the acrylic emulsion (A-1). Use of the polymerization initiator having an imidazole group and/or and imidazoline group (b-3) in an amount less than 0.001% by weight is not desirable, because curability may be insufficient and adhesion and corrosion resistance of the coating may be poor. Use of the amount larger than 30% by weight may cause reduction in storage stability of the emulsion coating.

The remarkably important effect of the polymerization initiator having an imidazole group and/or an imidazoline group (b-3) is to keep the emulsion polymerization system at pH 5 to 10 during the overall process of producing the acrylic emulsion (A-1), i.e., until the acrylic resin (A-1) is collected from the emulsion polymerization system. This effect enables to protect the epoxy group present in the acrylic emulsion (A-1) so that the cross-linking properties and curability of the coating can be retained or improved. When a silane compound having an epoxy group and an alkoxysilane group in the molecule (c-1) is blended therein, the epoxy group and alkoxysilane group in the silane compound (c-1) are also protected, leading to remarkable improvement in adhesion and corrosion resistance.

In the emulsion polymerization, if other polymerization initiator such as ammonium persulfate or potassium persulfate is used in place of the polymerization initiator having an imidazole group and/or an imidazoline group (b-3), then the effect of protecting the functional groups (i.e., epoxy group, alkoxysilane group) is lost and, as a result, improvement in adhesion, cross-linking properties and corrosion resistance cannot be achieved at all.

Therefore, it is quite important to use the polymerization initiator having an imidazole group and/or an imidazoline group (b-3) in the emulsion polymerization for producing the acrylic emulsion (A-1). The intended beneficial functions and performance of the acrylic emulsion (A-1) is provided by the use of the polymerization initiator having an imidazole group and/or an imidazoline group (b-3).

The acrylic emulsion (A-1) desirably has a particle size of 1 to 200 nm, preferably 30 to 180 nm, more preferably 40 to 160 nm. The particle size of 1 nm or larger is desirable, because the viscosity of the emulsion coating can be maintained properly and good coating workability can be provided. The particle size of 200 nm or smaller is desirable, because the emulsion particles are fused one another during the drying and curing of the coat film, and good coating appearance, water resistance and chemical resistance can be provided.

As an example, the acrylic emulsion (A-1) can be produced by the emulsion copolymerization of the acrylic monomer having an epoxy group (a-1), the acrylic monomer having an hydroxyl group (a-2) and optionally other unsaturated monomer (a-3), in an aqueous medium (e.g., ion exchanged water; preferably having pH of 5 to 7 at 25° C.) at pH 5 to 10 at a polymerization temperature of 20 to 100° C., preferably 30 to 80° C., using the polymerization initiator having an imidazole group and/or an imidazoline group and having no sulfate ion or chlorine ion in the molecule (b-3) (e.g., 2,2'-azobis[2-imidazolin-2-yl)propane]), the reactive emulsifier (D) (preferably those which has a ammonium sulfate salt) and optionally a non-ionic surfactant (e.g., polyoxyethylene nonylphenyl ether). The acrylic monomer having an epoxy group (a-1), the acrylic monomer having an hydroxyl group (a-2) and the other unsaturated monomer (a-3) may be any one selected from those compounds as mentioned above.

Alternatively, the acrylic emulsion (A-1) can also be produced by the emulsion copolymerization of the acrylic monomer having an epoxy group (a-1), the acrylic monomer having an hydroxyl group (a-2) and optionally other unsaturated monomer (a-3) in an aqueous medium using the reactive emulsifier having an unsaturated double bond in the molecule (D) and the polymerization initiator having an imidazole group and/or an imidazoline group (b-3) in the presence of the silane compound having an epoxy group and an alkoxysilane group in the molecule (c-1). This process is preferred, because various properties of the emulsion coating, including stability, curability, adhesion, weather resistance and scratch resistance, can be improved and storage stability can also be remarkably improved.

According to the present invention, it is of course possible to coat an aluminum or magnesium alloy or the like on which chemical conversion film (a film of chromium chromate or chromating-phosphating) is provided to improve corrosion resistance and adhesion of the coating. However, the true object of the present invention is to enable the direct coating of an aluminum or magnesium alloy or the like having no chemical conversion film thereon to provide the same or better effects and functions as or than those in the substrates with chemical conversion film.

The chemical conversion treatment such as treatment with chromate may cause serious environmental pollution and ultimately exert serious influence on biological environment, if the treatment solution is contaminated into the waste. Accordingly, it is ideal to perform the coating without any chemical conversion treatment, particularly without treatment with chromate, and those skilled in the art set such a goal.

According to the present invention, by blending the silane compound having an epoxy group and an alkoxy group in the molecule (c-1) with the acrylic resin (A), adhesion of the coating to an aluminum alloy, a magnesium alloy and so on can be remarkably improved. Moreover, the resistance of the coat film against corrosion, water and saline water can also be improved without forming a protective film by chemical conversion treatment.

This notable effect appears to be provided by such a mechanism that the alkoxysilane group and/or a silanol group in the silane compound having an epoxy group and a hydrolyzable alkoxysilane group in the molecule (c-1) can form a tight chemical bond with an aluminum alloy (Al—OH which seems to be present abundantly on the surface of the alloy), a magnesium alloy or the like via orientation to the aluminum or magnesium alloy or the like or hydrolysis, so that a chemically and electrically extremely stable, homogenous continuous layer can be formed on the surface of the alloy. In addition, the epoxy group in the silane compound having an epoxy group and a hydrolyzable alkoxysilane group in the molecule (c-1) can form a chemical, electrical or compatibilization-derived tight bond with the functional groups (i.e., epoxy and hydroxyl groups) of the acrylic resin (A), so that a homogenous, stiff coat film can be formed on the surface of the alloys. As a result, a good coating appearance can be provided, resistance of the coat film against scratch and weather can be improved, and chemical or electric development of corrosion on non-iron metals caused by any external factors can be prevented.

For making the silane compound having an epoxy group and a hydrolyzable alkoxysilane group in the molecule (c-1) present in the emulsion polymerization system for producing the acrylic emulsion (A-1), it is recommended to dissolve the silane compound (c-1) in the radical-polymerizable unsaturated monomers constituting the acrylic emulsion (A-1) and then subject the mixture to the emulsion polymerization. In this manner, the silane compound (c-1) can be blended readily.

As stated above, it is important to keep the system at pH 5 to 10 during the overall emulsion polymerization. If the pH value is not within the range, the epoxy group and the alkoxysilane group are used for the reaction and lost during the emulsion polymerization, and therefore the intended effects cannot be achieved.

The acrylic emulsion (A-1) may also be produced by the emulsion copolymerization of the acrylic monomer having an epoxy group (a-1), the acrylic monomer having an hydroxyl group (a-2) and optionally other unsaturated monomer (a-3) in an aqueous medium using the reactive emulsifier having an unsaturated double bond in the molecule (D) and the polymerization initiator having an imidazole group and/or an imidazoline group (b-3) in the presence of an acrylic polymer (E) (preferably the below-mentioned acrylic polymer (E-1) or (E-2)). This process is also preferred, because the rheology of the coating may be controlled readily and a good appearance without any defects may be obtained. In addition, resistance of the coating against water, chemicals and scratch may also be improved.

The acrylic polymer (E) is preferably blended in the acrylic emulsion (A-1) in an amount of 0.05 to 99% by weight, preferably 0.2 to 80% by weight, more preferably 2 to 50% by weight. If the amount is less than 0.005% by weight, remarkable improvement may not be achieved. Use of the amount larger than 99% by weight may cause reduction in film forming properties and therefore a homogenous and even coat film may not be formed.

The acrylic polymer (E) desirably has a particle size of 5 to 150 nm, preferably 5 to 120 nm, more preferably 10 to 120 nm. If the particle size is smaller than 5 nm, remarkable improvement may not be achieved. If the particle size is larger than 150 nm, a homogenous and even coat film may not be formed.

Examples of the acrylic polymer include those polymers produced by radical copolymerization of a (fluoro)alkyl ester monomer of (meth)acrylic acid, such as methyl methacrylate, n-butyl methacrylate, cyclohexyl methacrylate, lauryl methacrylate, trifluoroethyl methacrylate, methyl acrylate, n-butyl acrylate, cyclohexyl acrylate, lauryl acrylate and trifluoroethyl acrylate; an acrylic monomer having an epoxy group (a-1); an acrylic monomer having an hydroxyl group (a-2); an unsaturated monomer having a carboxyl group (a-4); and optionally other unsaturated monomer (a-3). The radical copolymerization may be performed by any polymerization method, such as solution polymerization, emulsion polymerization, suspension polymerization or block polymerization. The acrylic polymer may be in the form of solution particles or block. According to the present invention, it is preferred to produce the acrylic polymer as an emulsion by emulsion polymerization, because handling becomes easy and curability, appearance and so on of the coating containing the acrylic emulsion (A-1) becomes better.

The acrylic emulsion (A-1) may be produced by the emulsion copolymerization of the acrylic monomer having an epoxy group (a-1), the acrylic monomer having an hydroxyl group (a-2) and optionally other unsaturated monomer (a-3) in an aqueous medium using the reactive emulsifier having an unsaturated double bond in the molecule (D) and the polymerization initiator having an imidazole group and/or an imidazoline group (b-3) in the presence of the acrylic polymer (E) (preferably the below-mentioned acrylic polymer (E-1) or (E-2)) and the silane compound having an epoxy group and an alkoxysilane group in the molecule (c-1). This process is also preferred, because the rheology of the coating may be controlled readily and a good appearance without any defects may be obtained. In addition, curability, adhesion to hard adhesive metals (e.g., aluminum ally, magnesium alloy), and resistance against water, chemical and scratch of the coating may be improved.

The acrylic polymer (E) is preferably produced by the emulsion copolymerization of the acrylic monomer having an epoxy group (a-1) and an unsaturated monomer having a carboxyl group (a-4) in an aqueous medium using the reactive emulsifier having an unsaturated double bond in the molecule (D) and the polymerization initiator having an imidazole group and/or an imidazoline group (b-3), provided that the number of moles of (a-1)≦the number of moles of (a-4). (Acrylic polymer (E-1))

As an example, the acrylic polymer (E-1) can be produced by the emulsion copolymerization of the acrylic monomer having an epoxy group (a-1), the unsaturated monomer having an carboxyl group (a-4) and optionally other unsaturated monomer (a-3), in an aqueous medium (e.g., ion exchanged water; preferably having an electroconductivity of 500 µs/s or lower at 25° C.) at a polymerization temperature of 20 to 100° C. using the polymerization initiator having an imidazole group and/or an imidazoline group and having no sulfate ion or chlorine ion in the molecule (b-3) (e.g., 2,2'-azobis[2-imidazolin-2-yl)propane]) as a polymerization initiator, the reactive emulsifier (D) (preferably those which has a ammonium sulfate salt) and optionally a nonionic surfactant (e.g., polyoxyethylene nonylphenyl ether). The acrylic polymer (E-1) produced by the emulsion copolymerization desirably has pH of 5.0 to 10.0, preferably 6.0 to 9.5, more preferably 6.5 to 8.5, at 25° C. The pH value of the acrylic polymer (E-1) of 5.0 or higher is preferred, because it becomes readily possible to produce an acrylic emulsion which can form a graft polymer with the radical-polymerizable unsaturated monomer in the emulsion copolymerization in the subsequent acrylic emulsion production process. The pH value of the acrylic polymer (E-1) of 10.0 or lower is also preferred, because the rate of polymerization in the subsequent emulsion copolymerization increases sufficiently and, as a result, a problem that a large amount of unreacted monomers remain in the polymerization system is eliminated.

When the acrylic polymer (E-1) is produced by the emulsion polymerization in an aqueous medium using the reactive emulsifier having an unsaturated double bond in the molecule (D) and the polymerization initiator having an imidazole group and/or an imidazoline group (b-3), the stability and curability of the coating and corrosion resistance of the coated material can be improved.

When the acrylic polymer (E-1) is produced by the emulsion copolymerization of the acrylic monomer having an epoxy group (a-1) and an unsaturated monomer having a carboxyl group (a-4) in an aqueous medium using the reactive emulsifier having an unsaturated double bond in the molecule (D) and the polymerization initiator having an imidazole group and/or imidazoline group (b-3) [provided that the number of moles of (a-1)≦the number of moles of (a-4)], in addition to the above-stated advantages, various properties including resistance of the emulsion coating against solvents, scratch and weather can also be remarkably improved. When the acrylic monomer having an epoxy group (a-1) and the unsaturated monomer having an carboxyl group (a-4) satisfy the relationship: the number of moles of (a-1)≦the number of moles of (a-4), the acrylic polymer (E-1) can form sufficiently cross-linked polymer particles and resistance of the acrylic emulsion-containing coating against water, chemicals and scratch can be improved. In addition, the acrylic polymer (E-1) (cross-linked particles) reacts with the radical-polymerizable unsaturated monomer to form a graft structure during the emulsion polymerization in the subsequent acrylic emulsion production process. As a result, the acrylic polymers which form the acrylic emulsion becomes stable and stiff (i.e., hard to be separated). The scratch resistance, adhesion and weather resistance of the emulsion coating are also improved.

The acrylic polymer (E) may be an acrylic polymer (E-2) which is produced by the emulsion copolymerization of the unsaturated monomer comprising a compound having at least two unsaturated double bond in the molecule [preferably comprising an acrylic monomer having an epoxy group (a-1)] in an aqueous medium using the reactive emulsifier having an unsaturated double bond in the molecule (D) and the polymerization initiator having an imidazole group and/ or an imidazoline group (b-3). In this case, adhesion of the coating may be improved, and mechanical properties (e.g., impact resistance, flexing resistance) may also be remarkably improved.

Examples of the compound having at least two unsaturated double bonds in the molecule include unsaturated monomers having at least two acrylic and/or ethylenical unsaturated double bonds in the molecule, such as ethylene glycol diacrylete, diethylene glycol diacrylate, triethylene glycol diacrylate, polyethylene glycol diacrylate, trimethylolpropana triacrylate, pentaerythritol triacrylate, ethylene glycol dimethacrylate, diethylene glycol dimethacrylate, triethylene glycol dimethacrylate, polyethylene glycol dimethacrylate, trimethylolpropana trimethacrylate, pentaerythritol trimethacrylate, ethylene oxide-modified diacrylate of isocyanuric acid, ethylene oxide-modified triacrylate of isocyanuric acid, ethylene oxide-modified dimethacrylate of isocyanuric acid, ethylene oxide-modified trimethacrylate of isocyanuric acid, polyurethane diacrylate, polyester diacrylate, epoxy diacrylate and divinylbenzene, and oligomers and polymers thereof. The compound having at least two unsaturated double bonds in the molecule may be used singly or in combination.

In the acrylic polymer (E-1), it is preferred that the compound having at least two unsaturated double bonds in the molecule and the acrylic monomer having an epoxy group (a-1) be copolymerized. In this case, the acrylic polymer (E-1), together with the acrylic emulsion (A-1), serves to improve the stiffness of the coat film during the film forming process.

The acrylic polymer (E-1) is preferably emulsion polymerized at pH 5 to 10. This is because the functional groups in the acrylic emulsion (A-1) can be protected during the production of the acrylic emulsion (A-1), and curability and adhesion of the coating may be improved.

The glass transition temperature of the acrylic polymer (E-1) may vary depending on the intended stiffness, strength and hardness to be provided to the coat film. The refractive index between the acrylic polymer (E-1) and the acrylic emulsion (A-1) may be different, depending on whether a mat (delustered) coat film or a coat film having good brightness and clarity is to be formed.

In addition to the components mentioned above, the coating composition of the present invention may further contain an additive which is commonly blended in a coating for the production of a coating, including an organic solvent, such as toluene, xylene, butyl acetate and methyl isobutyl ketone; a pigment, such as titanium dioxide, calcium carbonate and carbon black; a pigment dispersing agent; a defoaming agent; an anti-settling agent; and a leveling agent.

The coating may be applied by any conventional coating method, including spray coating, roll coating and electrostatic coating.

The material which can be coated with the coating of the present invention includes, for example, plastics such as acrylonitrile-styrene-butadiene (ABS) resin, polystyrene (PS) resin, polyphenylene sulfide (PPS) and acrylic resin; metals such as iron, aluminum, magnesium and titanium; alloys; and inorganic construction materials such as mortar and asbestos cement.

EXAMPLES

The present invention will be described in more detail in the following examples. Unless otherwise stated, all of the numerals denote part(s) by weight and all of the percentages denote % by weight.

Example 1

In a 2L four-inlet flask equipped with a stirrer, a thermometer and a nitrogen gas inlet was charged 393.2 g of xylene (XYL)/propylene glycol monomethyl ether (PM) (=70/30), and heated to 90° C. To a 1L beaker were charged 500 g of methyl methacrylate (MMA)/n-butyl methacrylate (BMA)/n-butyl acrylate (BA)/glycidyl methacrylate (GMA)/2-hydroxyethyl methacrylate (HEMA) (=32/20/20/20/8), 1 g of n-dodecyl mercaptane (DM) and 5 g of α,α-azobisisobutyronitrile (AIBN). The mixture was stirred until a homogenous mixture was produced, thereby a monomer mixture was prepared. The monomer mixture was added dropwise to the flask over 4 hours using a dropping pump (a constant delivery pump). After the dropwise addition was completed, the polymerization reaction was continued for 1 hour. A mixed slurry of XYL (100 g) and AIBN (0.8 g) was added to the reaction solution dividedly by three portions at 1-hour intervals. Thereafter, the polymerization was continued for additional 1 hour, thereby producing an acrylic resin (A-1), which had a solid content of 50%, an epoxy equivalent of 710, a hydroxyl functionality of 34.5 mgKOH and a number average molecular weight of 22000.

The acrylic resin (A-1) was blended with 0.5% by weight of 2,4,6-tris(dimethylaminomethyl)phenol (TAP), thereby giving a curable coating composition of Example 1.

The coating composition was diluted with a toluene/xylene/Anone/butyl acetate/n-butanol (=20/20/20/20/20) mixed solvent so that the dilution solution had a viscosity of 13 sec. (25° C.) as measured with Ford cup No. 4. In this manner, a test coating (1) which used the curable coating composition of Example 1 was prepared.

Example 2

In a 2L four-inlet flask equipped with a stirrer, a thermometer and a nitrogen gas inlet were charged 370 g of toluene (TOL)/γ-butyrolactone (=70/30) and 44.5 g of "ARON Macromer AA-6" (methyl methcrylate macromer, 45% solution in toluene; Toagosei Co., Ltd.) and heated to 90° C. To a 1L beaker were charged 480 g of MMA/BA/GMA/HEMA [MMA/BA/GMA/HEMA/"ARON Macromer AA-6"=61/5/15/15/4, as determined in terms of the solid content of ARON Macromer AA-6] and 5.0 g of AIBN. The mixture was stirred until a homogenous mixture was produced, thereby a monomer mixture was prepared. The monomer mixture was added dropwise to the flask over 4 hours using a dropping pump (a constant delivery pump). After the dropwise addition was completed, the polymerization reaction was continued for 1 hour. A mixed slurry of TOL (15 g) and AIBN (1.0 g) was added to the reaction solution dividedly by three portions at 1-hour intervals. Thereafter, the polymerization was continued for additional 1 hour, thereby producing an acrylic resin (A-2), which had a solid content of 48%, an epoxy equivalent of 946, a hydroxyl functionality of 64.7 mgKOH and a number average molecular weight of 10000.

The acrylic resin (A-2) was blended with 5% by weight of "JEFFAMIN EDR-148" (SUN Technochemicals, Inc.), thereby giving a curable coating composition of Example 2.

The coating composition was diluted with a toluene/xylene/Anone/butyl acetate/n-butanol (=20/20/20/20/20) mixed solvent so that the dilution solution had a viscosity of 13 sec. (25° C.) as measured with Ford cup No. 4. In this manner, a test coating (2) which used the curable coating composition of Example 2 was prepared.

Example 3

The acrylic resin (A-2) was blended with 25% by weight of "SH-6040" (γ-glycidoxypropyl trimethoxysilane; Dow Corning Toray Silicone Co., Ltd.) and 0.25% by weight of "CUREZOL 2E4MZ", thereby producing a curable coating composition of Example 3.

The coating composition was diluted with a toluene/xylene/Anone/butyl acetate/n-butanol (=20/20/20/20/20) mixed solvent so that the dilution solution had a viscosity of 13 sec. (25° C.) as measured with Ford cup No. 4. In this manner, a test coating (3) which used the curable coating composition of Example 3 was prepared.

Example 4

The acrylic resin (A-2) was blended with 25% by weight of "SH-6040", 0.25% by weight of "CUREZOL 2E4MZ" and 5% by weight of "COATAX" MR-409" (an acrylic resin, solid content: 55%, acid value: 53 mgKOH, base value: 36 mgKOH, number average molecular weight: 5000; Toray Industries, inc.), thereby producing a curable coating composition of Example 3.

The coating composition was diluted with a toluene/xylene/Anone/butyl acetate/n-butanol (=20/20/20/20/20) mixed solvent so that the dilution solution had a viscosity of 13 sec. (25° C.) as measured with Ford cup No. 4. In this manner, a test coating (4) which used the curable coating composition of Example 4 was prepared.

Example 5

(i) In a 2L four-inlet flask were charged 574 g of ion exchanged water (PW) (electroconductivity: 0.5 μs/cm, 25° C.), 35.7 g of "LATEMUL S-180A" (a reactive emulsifier corresponding to Compound VI; Kao Corporation), 0.25 g of "VA-061" (2,2'-azobis[2-(2-imidazolin-2-yl)]propane, a polymerization initiator having an imidazoline group; Wako Pure Chemical Industries,. Ltd.) and 100 g of MMA/"SIPOMER β-CEA" (β-carboxyethyl acrylate; Rhone-Poulenc)/GMA (MMA/"SIPOMER β-CEA"/GMA=92.5/5.0/2.5) ([GMA] (the number of moles of GMA)/[β-CEA] (the number of moles of β-CEA)=1/1.7], and then heated to 70° C. The emulsion polymerization was conducted at 70° C. for 2 hours, thereby giving an acrylic polymer (E-1-1).

(ii) In a dropping vessel 1 were charged 400 g of MMA/BA/"BLEMMER GH" (glycidyl methacrylate (electron grade); NOF Corporation)/HEMA (MMA/BA/GMA/HEMA=55/20/15/10) and 60 g of "SH-6040". The mixture was stirred to give a homogenous solution.

(iii) In a dropping vessel 2 were charged 0.8 g of "VA-061" and 80 g of PW. The mixture was stirred to give a homogenous solution.

(iv) To the acrylic polymer (E-1-1) prepared in step (i) were added dropwise the solutions from the dropping vessels 1 and 2 over 2 hours. After the addition was completed, the emulsion polymerization was conducted at 70° C. for additional 2 hours, thereby giving an acrylic emulsion (1) of Example 5.

The acrylic emulsion (1) had a solid content of 45%, viscosity of 250 mPa·s/25° C., pH of 8.2 and particle size of 145 nm.

The acrylic emulsion (1) was added with 10% by weight of a film forming auxiliary "DAWANOL DPnB" (dipropylene glycol monobutyl ether; Dow Chemical Japan Limited) and 0.5% by weight of γ-butyrolactone (GBL) PW was added to the mixture so that the solution had a viscosity of 15 sec. (25° C.) as measured with Ford cup No. 4. In this manner, an emulsion coating (5) which used the acrylic emulsion (1) of Example 5 was prepared.

Example 6

(i) In a 2L four-inlet flask were charged 292 g of PW (electroconductivity: 0.1 μs/cm, 25° C.), 2.5 g of "ADEKA REASOAB SE-1025A" (an ammonium salt of α-sulfo-ω-(1-nonylphenoxy)methyl-2-(2-puropenyloxy)ethoxy-poly (oxy-1,2-ethanediyl; a reactive emulsifier corresponding to formula (VI); Asahi Denka Kogyo KK) and then stirred.

In 50 g of BA/"BLEMMER GH"/trimethylolpropane triacrylate (TMPTA) (=94/5/1) was dissolved 1 g of "SANOL LS-2626" (1-[2-[3-(3,5-di-t-butyl-4-hydroxyphenyl)propyonyloxy]ethyl]-4-[3-(3,5-di-t-butyl-4-hydroxyphenyl)propyonyloxy]-2,2,6,6-tetramethylpiperidine; HALS with pKb=12; Sankyo Co., Ltd.) to give a monomer solution.

In a homogenizer were charged 50 g of PW (25° C.), 5.5 g of "ADEKA REASOAB SE-1025A", 0.1 g of "VA-061" and all of the monomer solution. The mixture was emulsified at 5000 rpm for 10 min. at 25° C. to give a monomer emulsion (1).

All of the monomer emulsion (1) was charged in a flask and then subjected to emulsion polymerization at 70° C. for 150 min. to produce an acrylic polymer (E-2-1), which had particle size of 50 nm and pH of 7.3.

(ii) In 450 g of MMA/BMA/BA/"BLEMMER GH"/HEMA/"BLEMMER PDT-650" (polytetramethylene glycol dimethacrylate; NOF Corporation) (=55/5/10/15/10/5) was dissolved 9 g of "SANOL LS-2626". The solution was added with 50 g of "SH-6040" to give a homogenous solution.

In a homogenizer were charged 450 g of PW (25° C.) and 2.5 g of "VA-061". The solution was stirred to dissolve the "VA-061". To the solution were added all of the above-prepared solution, 37 g of "ADEKA REASOAB SE-1025A" and 2.0 g of "EMULGEN 1135S-70" (a nonionic surfactant; Kao Corporation). The mixed solution was emulsified at 5000 rpm for 10 min. at 25° C. to give a monomer emulsion (2).

The monomer emulsion (2) was added dropwise to a flask over 3 hours. After the addition was completed, the reaction solution was subjected to emulsion polymerization at 70° C., for 2 hours and then aging reaction to produce an acrylic emulsion (A-2).

The acrylic emulsion (A-2) had a solid content of 40%, viscosity of 600 mPa·s, particle size of 98 nm and pH of 7.2.

The acrylic emulsion (A-2) was blended with 2% by weight of "Surfynol 104" (2,4,7,9-tetramethyl-5-decyne-4,7-diol; a surfactant (defoaming agent); Air Products & Chemicals) (which was previously dissolved at 65° C.) and 10% by weight of a film forming agent "DAWANOL TPnB" (tripropylene glycol mono-n-butyl ether: Dow Chemical Japan Limited). PW was added to the mixture so that the solution had a viscosity of 15 sec. (25° C.) as measured with Ford cup No. 4. In this manner, an emulsion coating (6) for use in the coating test was prepared.

Example 7

(i) In a stainless steel vessel were charged 796 g of PW (electroconductivity: 0.1 μs/cm, 25° C.) and 4.0 g of "VA-061" and then stirred to give a homogenous aqueous initiator solution.

(ii) In a 5L four-inlet flask was charged 808 g PW and 128 g of "ADEKA REASOAB SE-1025A" and then stirred.

(iii) In a stainless steel vessel was charged 160 g of BA/"BLEMMER GH"/TMPTA/"SANOL LS-2626" (=92.5/5.0/0.5/2.0) and then stirred to give a homogenous monomer solution (1).

(iv) The monomer solution (1) was charged in a flask and then stirred. The heating of the solution was started. When the temperature of the solution reached 60° C., a portion (20%) of the aqueous initiator solution was added to the solution, and then the heating was continued until the temperature reached 68° C. At this point of time, emulsion polymerization was conducted at 68° C. for 150 min. to produce an acrylic polymer (E-2-2), which had particle size of 30 nm and pH of 7.1.

(v) In a stainless steel vessel was charged 1440 g of MMA/BA/HEMA/"BLEMMER GH"/"SH-6040"/"BLEMMER PDT-650"/"SANOL LS-2626" (=41.9/12.6/11.1/16.7/8.9/6.7/2.1) and then stirred to give a homogenous monomer solution (2).

(vi) In an emulsifier apparatus were charged 720 g of PW and 64 g of "ADEKA REASOAB SE-1025A" and then charged the monomer solution (2). The mixture was emulsified at 5000 rpm for 10 min. at 25° C. to give a monomer emulsion (1).

(vii) The monomer emulsion (1) and the remainder (i.e. 80%) of the aqueous initiator solution were added dropwise to a flask over 4 hours and 5 hours, respectively, while keeping the polymerization temperature at 68° C.

(viii) After the addition was completed, aging reaction was conducted for additional 1 hour at 68° C. to produce an acrylic emulsion (A-3).

The acrylic emulsion (A-3) had a solid content of 40%, viscosity of 800 mPa·s, particle size of 92 nm and pH of 7.2.

The acrylic emulsion (A-3) was blended with 2% by weight of "Surfynol 104" (which was previously dissolved at 65° C.) and 10% by weight of "DAWANOL TPnB" as a film forming agent. PW was added to the mixture so that the solution had a viscosity of 15 sec. (25° C.) as measured with Ford cup No. 4. In this manner, an emulsion coating (7-1) for use in the coating test was prepared.

The acrylic emulsion (A-3) was blended with 2% by weight of "Surfynol 104" (which was previously dissolved at 65° C.) and 10% by weight of "DAWANOL TPnB" as a film forming agent. PW was added to the mixture so that the solution had a viscosity of 50 sec. (25° C.) as measured with Ford cup No. 4. In this manner, an emulsion coating (7-2) for use in the coating test was prepared.

Example 8

(i) In a stainless steel vessel were charged 796 g of PW (electroconductivity: 0.1 µs/cm, 25° C.) and 4.0 g of "VA-061" and then stirred to give a homogenous aqueous initiator solution.

(ii) In a 5L four-inlet flask was charged 808 g of PW and 128 g of "ADEKA REASOAB SE-1025A" and then stirred.

(iii) In a stainless steel vessel was charged 160 g of MMA/"BLEMMER GH"/TMPTA/"SANOL LS-2626" (=92.5/5.0/0.5/2.0) and then stirred to give a homogenous monomer solution (1).

(iv) The monomer solution (1) was charged in a flask and then stirred. The heating of the solution was started. When the temperature of the solution reached 60° C., a portion (20%) of the aqueous initiator solution was added to the solution, and then the heating was continued until the temperature reached 68° C. At this point of time, emulsion polymerization was conducted at 68° C. for 150 min. to produce an acrylic polymer (E-2-3), which had particle size of 25 nm and pH of 7.2.

(v) In a stainless steel vessel was charged 1440 g of MMA/BA/HEMA/"BLEMMER GH"/"SH-6040"/"BLEMMER PDT-650"/"SANOL LS-2626" (=46.6/12.6/11.1/16.7/8.9/2.0/2.1) and then stirred to give a homogenous monomer solution (2).

(vi) In an emulsifier apparatus were charged 720 g of PW and 64 g of "ADEKA REASOAB SE-1025A" and then charged the monomer solution (2). The mixture was emulsified at 5000 rpm for 10 min. at 25° C. to give a monomer emulsion (2).

(vii) The monomer emulsion (2) and the remainder (i.e. 80%) of the aqueous initiator solution were added dropwise to a flask over 4 hours and 5 hours, respectively, while keeping the polymerization temperature at 68° C.

(viii) After the addition was completed, aging reaction was conducted for additional 1 hour at 68° C. to produce an acrylic emulsion (A-4).

The acrylic emulsion (A-4) had a solid content of 40%, viscosity of 1200 mPa·s, particle size of 88 nm and pH of 7.2.

The acrylic emulsion (A-4) was blended with 2% by weight of "Surfynol 104" (which was previously dissolved at 65° C.) and 10% by weight of "DAWANOL TPnB" as a film forming agent. PW was added to the mixture so that the solution had a viscosity of 15 sec. (25° C.) as measured with Ford cup No. 4. In this manner, an emulsion coating (8-1) for use in the coating test was prepared.

The acrylic emulsion (A-4) was blended with 2% by weight of "Surfynol 104" (which was previously dissolved at 65° C.) and 10% by weight of "DAWANOL TPnB" as a film forming agent. PW was added to the mixture so that the solution had a viscosity of 50 sec. (25° C.) as measured with Ford cup No. 4. In this manner, an emulsion coating (8-2) for use in the coating test was prepared.

Example 9

(i) In a 2L four-inlet flask were charged 800 g of PW (electroconductivity: 1.0 µs/cm, 25° C.), 35.7 g of "LATEMUL S-180" (a reactive emulsifier corresponding to formula (V); Kao Corporation), 0.25 g of "VA-061" and 50 g of MMA/BA/GMA/HEMA (=65/10/15/10), and then heated to 80° C.

The emulsion polymerization was conducted at 80° C. for 30 min.

(ii) In a dropping vessel 1 were charged 450 g of MMA/BA/GMA/HEMA (=65/10/15/10) and 75 g of "SH-6040". The mixture was stirred to give a homogenous solution.

(iii) In a dropping vessel 2 were charged 1.0 g of "VA-061" and 100 g of PW. The mixture was stirred to give a homogenous solution.

(iv) The solutions in the dropping vessels 1 and 2 were added dropwise to a flask over 3 hours. After the addition was completed, the emulsion polymerization was conducted at 80° C. for additional 2 hours, thereby giving an acrylic emulsion (A-5) of Example 9.

The acrylic emulsion (A-5) had a solid content of 40%, viscosity of 120 mPa·s and pH of 8.0, and contained no sulfate ion.

The acrylic emulsion (A-5) was added with 15% by weight of γ-butyrolactone (GBL) as a film forming auxiliary. PW was added to the mixture so that the solution had a viscosity of 15 sec. (25° C.) as measured with Ford cup No. 4. In this manner, a test emulsion coating (9) was prepared.

Comparative Example 1

Substantially the same procedure as in Example 3 was conducted, except that the monomer composition for the acrylic resin (A-2) was changed to MMA/BA/GMA/"ARON Macromer AA-6" (=61/20/15/4, as determined in terms of the solid content of ARON Macromer AA-6), thereby giving a curable coating composition of Comparative Example 1.

The coating composition was diluted with a toluene/xylene/Anone/butyl acetate/n-butanol (=20/20/20/20/20) mixed solvent so that the dilution solution had a viscosity of 13 sec. (25° C.) as measured with Ford cup No. 4. In this manner, a test coating (10) which used the curable coating composition of Comparative Example 1was prepared.

Comparative Example 2

(i) In a 2L four-inlet flask were charged 800 g of PW, 35.7 g of "LATEMUL-S-180", 0.25 g of ammonium persulfate and 50 g of MMA/BA/GMA/HEMA (=65/10/15/10), and then heated to 80° C.

The emulsion polymerization was conducted at 80° C. for 30 min.

(ii) In a dropping vessel 1 were charged 450 g of MMA/BA/GMA/HEMA (=65/10/15/10) and 75 g of "SH-6040". The mixture was stirred to give a homogenous solution.

(iii) In a dropping vessel 2 were charged 1.0 g of ammonium persulfate and 100 g of PW. The mixture was stirred to give a homogenous solution.

(iv) The solutions in the dropping vessels 1 and 2 were added dropwise to a flask over 3 hours. After the addition was completed, the emulsion polymerization was conducted at 80° C. for additional 2 hours, thereby giving an acrylic emulsion (A-6) of Comparative Example 2.

The acrylic emulsion (A-6) had a solid content of 40%, viscosity of 180 mPa·s and pH of 3.8.

The acrylic emulsion (A-6) was neutralized with aqueous ammonium to pH 8.0, and then added with 15% by weight of GBL as a film forming auxiliary. PW was added to the mixture so that the solution had a viscosity of 15 sec. (25° C.) as measured with Ford cup No. 4. In this manner, a comparative emulsion coating (11) was prepared.

Comparative Example 3

Substantially the same procedure as in Example 6 was conducted, except that ammonium persulfate was used in place of "VA-061", thereby giving an acrylic emulsion (A-7) of Comparative Example 3.

The acrylic emulsion (A-7) had a solid content of 40%, viscosity of 500 mPa·s and pH of 4.2.

The acrylic emulsion (A-7) was neutralized with aqueous ammonium to pH 8.0, and then added with 10% by weight of "DAWANOL DPnB" as a film forming auxiliary. PW was added to the mixture so that the solution had a viscosity of 15 sec. (25° C.) as measured with Ford cup No. 4. In this manner, a comparative emulsion coating (12) was prepared.

The coatings (1) to (12) prepared in Example 1 to Comparative Example 3 were used to assess the performance and properties of coat films. The test methods and results are as follows.

Test 1

[Preparation of Test Coated Plates]

The coatings (1), (2), (4) and (10) were used to prepare coated plates to be tested.

[Preparation of Coated Plates for Adhesion and Water Resistance Tests]

(1) Each coating was spray coated onto a PPS plate to the coating thickness of 30 μm, and then baked at 120° C. for 30 min. The coated plate was allowed to dry at room temperature for 3 days, which was used in the following adhesion test.

(2) An AZ91D magnesium alloy plate (thickness: 2 mm), which had been tixo-molded, was barreled, defatted with aqueous 0.5% NaOH solution, subjected to conversion treatment with chromate in a conventional manner, spray coated with each coating to the coating thickness of 15 μm, and then baked at 160° C. for 20 min. The coated plate was allowed to dry at room temperature for 3 days, which was used in the following adhesion and water resistance tests to be tested The methods for tests and evaluations were as follows. The results are shown in Table 1.

1. Adhesion

The test was conducted according to JIS K 5400 (the cross-cut test). A coat film of which the test result was 100/100 was determined "success".

2. Water Resistance

A test coated plate was immersed in ion exchanged water (50° C.) for 48 hours and then allowed to dry at room temperature for 1 day. The plate was determined for its appearance and then subjected to the adhesion test. A coat film of which appearance had no change (e.g., blister, blushing (whitening)) was determined "success". In the color development test of a coat film, ΔE was determined with CR-331 (Minolta Co., Ltd.), and a coat film having a ΔE value of 2 or lower was determined "success". In the adhesion (i.e., the test for re-adhesion after water-immersing and drying) test, a coat film of which the test result was 100/100 was determined "success".

TABLE 1

Test results for coat film

| Test items | Coating 1 (Ex. 1) | Coating 2 (Ex. 2) | Coating 4 (Ex. 4) | Coating 10 (CEx. 1) |
|---|---|---|---|---|
| PPS plate | | | | |
| Adhesion | 100/100 | 100/100 | 100/100 | 40/100 |
| Water resistance | | | | |
| Appearance | Success | Success | Success | Success |
| Color development | Success | Success | Success | Blushing |
| Adhesion | Success | Success | Success | 0/100 |
| AZ91D plate | | | | |
| Adhesion | 100/100 | 100/100 | 100/100 | 0/100 |
| Water resistance | | | | |
| Appearance | Success | Success | Success | Success |
| Color development | Success | Success | Success | Blister |
| Adhesion | Success | Success | Success | 0/100 |

Test 2:

[Preparation of Test Coated Plates]

The coatings (2), (4) and (10) were used for the various tests. The methods for tests and evaluation are as follows. The results are shown in Table 2.

[Preparation of Test Coated Plates]

An AZ31 magnesium alloy plate (thickness: 1 mm), which had been molded by press forging, was subjected to hair-line processing, defatted with aqueous 0.5% NaOH solution, splay coated with each of the coatings (3), (4) and (10) to the coating thickness of 15 μm, and then baked at 160° C. for 20 min.

[Evaluation Methods]

[Coat Film Appearance]

The appearance of a coat film after baking was visually evaluated. A coat film of which surface was even and had no cratering, cracking or flashing was determined "success (good)".

[Adhesion]

Adhesion of a test coat film was evaluated by the cross-cut test according to JIS K 5400. A coat film of which the test result was 100/100 was determined "success", while a coat film of which the test result was not so was determined "failed".

[Coat Film Hardness]

Harness of a coat film was determined as the scratch resistance by the pencil harness test according JIS K 5400. A coat film having a harness of 2H or higher was determined "success".

[Water Resistance]

A coated plate was immersed in hot water (50° C.) for 10 days and then evaluated for the appearance of the coat film. A coat film of which surface had no flashing, blister, blushing or peeling was determined "success (good)".

[Salt Spray Test]

The test was conducted according to JIS K 5400 using a salt spray tester for 100 hours. A coated plate of which the cut area had no corrosion and of which the film surface had no blister, peeling or discoloration was determined "success (no problem)".

TABLE 2

Coat film test results

| Test items | Coating 3 (Ex. 3) | Coating 4 (Ex. 4) | Coating 10 (CEx. 1) |
|---|---|---|---|
| Coat film appearance | Success | Success | Success |
| Adhesion | 100/100 | 100/100 | 0/100 |
| Coat film hardness | 5 H | 3 H | F |
| Water resistance | Success | Success | |
| Salt spray property | | | |
| Appearance | Success | Success | Corrosion in the whole area |
| Adhesion | 100/100 | 100/100 | 0/100 |

Test 3:

The coatings (5), (6), (7-1), (8-1), (9), (11) and (12) were used for the various tests. The methods for tests and evaluation are as follows. The results are shown in Table 3.

[Preparation of Test Coated Plates]

Each of aluminum plates JIS A-1100, 3004 and 5052 (thickness: 1 mm) was defatted with aqueous 3% solution of "Fine Cleaner 315" (a defatting agent; Nihon Perkerizing Co., Ltd.) at 60° C. for 5 min., washed with water, dried with air, spray coated with each of the coatings to the film thickness of 20 μm, and then baked at 230° C. for 1 min.

[Evaluation Methods for Coat Films]

[Coat Film Appearance]

The appearance of a coat film after baking was visually evaluated. A coat film of which surface was even and had no cratering, cracking or flashing was determined "success (good)".

[Adhesion]

Adhesion of a coat film was evaluated by the cross-cut test according to JIS K 5400. A coat film of which the test result was 100/100 was determined "success", while a coat film of which the test result was not so was determined "failed".

[Coat Film Hardness]

Harness of a coat film was determined as the scratch resistance by the pencil harness test according JIS K 5400. A coat film having a harness of F or higher was determined "success".

[Water Resistance]

A coated plate was immersed in hot water (50° C.) for 10 days and then evaluated for the appearance of the coat film. A coat film of which surface had no flashing, blister, blushing or peeling was determined "success (good)".

[Humidity Resistance]

A coated plate was exposed to a 98% RH atmosphere for 1000 hours, and then evaluated for the appearance. A coat film of which surface had no flashing, blister, blushing or peeling was determined "success (good)".

[Salt Spray Test]

The test was conducted according to JIS K 5400 using a salt spray tester for 1000 hours. A coated plate of which the cut area had no corrosion and of which the film surface had no blister, peeling or discoloration was determined "success (no problem)".

Test 4:

The coatings (7-2) and (8-2) were used and tested for coating workability on a roll coater. The coating was conducted by the method commonly employed for coil coating of an aluminum alloy and an iron plate.

Both of the coatings (7-2) and (8-2) exhibited good pickup property, application property, coat film thickness controlling property (1 to 30 μm) and coat film appearance.

TABLE 3

Coat film test results

| Test items | Coating 5 (Ex. 5) | Coating 6 (Ex. 6) | Coating 7-1 (Ex. 7) | Coating 8-1 (Ex. 8) | Coating 9 (Ex. 9) | Coating 11 (CEx. 2) | Coating 12 (CEx. 3) |
|---|---|---|---|---|---|---|---|
| Coat film appearance | | | | | | | |
| 1100 | Success | Success | Success | Success | Success | Cissing | Success |
| 3004 | Success | Success | Success | Success | Success | Cissing | Success |
| 5052 | Success | Success | Success | Success | Success | Success | Success |
| Adhesion | | | | | | | |
| 1100 | 100/100 | 100/100 | 100/100 | 100/100 | 100/100 | 20/100 | 20/100 |
| 3004 | 100/100 | 100/100 | 100/100 | 100/100 | 100/100 | 20/100 | 20/100 |
| 5052 | 100/100 | 100/100 | 100/100 | 100/100 | 100/100 | 20/100 | 20/100 |
| Coat film hardness | | | | | | | |
| 1100 | 2 H | H | H | 3 H | 2 H | F | H |
| 3004 | 2 H | H | H | 3 H | 2 H | H | H |
| 5052 | 2 H | 2 H | 2 H | 4 H | 3 H | H | 2 H |
| Water resistance | | | | | | | |
| 1100 | Success | Success | Success | Success | Success | Blushing, peeling | Blushing, peeling/ |
| 3004 | Success | Success | Success | Success | Success | Blushing, peeling | Blushing, peeling |
| 5052 | Success | Success | Success | Success | Success | Blushing, peeling | Blushing, peeling |

TABLE 3-continued

| Test items | Coating 5 (Ex. 5) | Coating 6 (Ex. 6) | Coating 7-1 (Ex. 7) | Coating 8-1 (Ex. 8) | Coating 9 (Ex. 9) | Coating 11 (CEx. 2) | Coating 12 (CEx. 3) |
|---|---|---|---|---|---|---|---|
| Humidity resistance | | | | | | | |
| 1100 | Success | Success | Success | Success | Success | Blushing, peeling | Blushing, peeling/ |
| 3004 | Success | Success | Success | Success | Success | Blushing, peeling | Blushing, peeling |
| 5052 | Success | Success | Success | Success | Success | Blushing, peeling | Blushing, peeling |
| Salt spray test | | | | | | | |
| 1100 | Success | Success | Success | Success | Success | Corrosion in the whole area | Corrosion in the whole area |
| 3004 | Success | Success | Success | Success | Success | Corrosion in the whole area | Corrosion in the whole ares |
| 5052 | Success | Success | Success | Success | Success | Corrosion in the whole area | Corrosion in the whole area |

INDUSTRIAL APPLICABILITY

A curable coating composition can be provided which has good adhesion to hard adhesive metals such as magnesium alloys, aluminum alloys titanium alloys and stainless steel and plastics such as polystyrene, acrylonitrile-styrene-butadiene (ABS) resin and polypropylene.

The invention claimed is:

1. A method for forming an acrylic emulsion comprising:
emulsion copolymerization of monomers comprising an acrylic monomer having an epoxy group (a-1), an acrylic monomer having a hydroxyl group (a-2) using a reactive emulsifier having an unsaturated double bond in the molecule (D) and a polymerization initiator having an imidazole group and/or an imidazoline group (b-3) in the presence of a silane compound having an epoxy group and an alkoxy group in the molecule (c-1).

2. The method according to claim 1, wherein the acrylic emulsion is produced by the emulsion copolymerization under the condition of pH 5 to 10.

3. The method according to claim 1, wherein the acrylic emulsion is produced by the emulsion copolymerization in an aqueous medium in the presence of an acrylic polymer (E).

4. The method according to claim 3, wherein the acrylic polymer (E) is produced by the emulsion copolymerization of at least two unsaturated monomers comprising an unsaturated monomer having at least one epoxy group (a-1) and an unsaturated monomer having a carboxyl group (a-4) in an aqueous medium using a reactive emulsifier having an unsaturated double bond in the molecule (D) and a polymerization initiator having an imidazole group and/or imidazoline group (b-3), the number of moles of (a-1) is equal to or smaller than that of (a-4).

5. The method according to claim 3, wherein the acrylic polymer (E) is produced by the emulsion copolymerization of an unsaturated monomer comprising a compound having at least two unsaturated double bonds in the molecule in an aqueous medium using a reactive emulsifier having an unsaturated double bond in the molecule (D) and a polymerization initiator having an imidazole group and/or imidazoline group (b-3).

6. An acrylic emulsion produced according to the process of claim 1.

7. A curable coating composition comprising an acrylic resin having an epoxy group and a hydroxyl group in the side chain (A), a compound having an amino group having a molecular weight of not greater than 1000 (B), and a silane compound having an epoxy group or amino group in the molecule (C), the silane compound (C) being contained in an amount of from 0.02 to 500% by weight based on the total amount of the acrylic resin (A) and the compound having an amino group (B), wherein the compound having an amino group (B) is represented by general formula (I) (b-1):

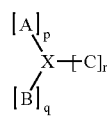

[I]

wherein:

X represents a hydrogen atom, an aliphatic hydrocarbon group having 1 to 10 carbon atoms which has at least one substituent selected from the group consisting of A, B and C, a group having a benzene skeleton which may be substituted by a hydroxyl group and/or an alkyl group having 1 to 10 carbon atoms, or an alicyclic hydrocarbon group having 3 to 10 carbon atoms;

each of A, B and C is independently a group represented by the general formula (II) or (III):

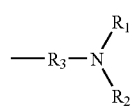

[II]

-continued

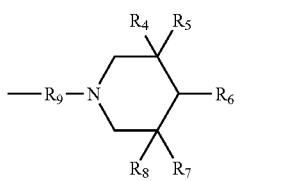

[III]

wherein each of $R_1$, $R_2$, $R_4$, $R_5$, $R_6$, $R_7$ and $R_8$ independently represents a hydrogen atom or an alkyl group having 1 to 10 carbon atoms; each of $R_3$ and $R_9$ independently represents an alkylene group having 1 to 10 carbon atoms or a carbonyl group; and each of p, q and r is an integer of 0 to 1, provided that at least one of p, q and r is 1.

8. A curable coating composition comprising an acrylic resin having an epoxy group and a hydroxyl group in the side chain (A), a compound having an amino group having a molecular weight of not greater than 1000 (B), and a silane compound having an epoxy group or amino group in the molecule (C), the silane compound (C) being contained in an amount of from 0.02 to 500% by weight based on the total amount of the acrylic resin (A) and the compound having an amino group (B), wherein the compound having an amino group (B) is a compound having an imidazole group and/or an imidazoline group (b-2).

9. The curable coating composition according to claim 7, wherein the acrylic resin (A) is prepared by polymerization using a polymerization initiator having an imidazole group and/or an imidazoline group (b-3).

10. A magnesium alloy having thereon a coat film formed with the curable coating composition of claim 7, but having no chromate conversion film.

11. A magnesium alloy having thereon a coat film formed with the curable coating composition of claim 8, but having no chromate conversion film.

12. An aluminum alloy having thereon a coat film comprising the curable coating composition of claim 7, but having no chromate conversion film.

13. An aluminum alloy having thereon a coat film comprising the curable coating composition of claim 8, but having no chromate conversion film.

* * * * *